United States Patent [19]

Mehra et al.

[11] Patent Number: 5,587,756
[45] Date of Patent: Dec. 24, 1996

[54] FILM CARTRIDGE WITH VISUAL INDICATOR FOR VERIFYING FILM LOADING IN CAMERA

[75] Inventors: Madhav Mehra; Joseph A. Manico, both of Rochester, N.Y.

[73] Assignee: Eastman Kodak Company, Rochester, N.Y.

[21] Appl. No.: 586,520

[22] Filed: Jan. 16, 1996

[51] Int. Cl.[6] ............................. G03B 17/26; G03B 23/02
[52] U.S. Cl. ........................ 396/515; 242/348; 396/284
[58] Field of Search ........................... 354/275, 289.1; 242/348, 348.4

[56] References Cited

U.S. PATENT DOCUMENTS

| | | | |
|---|---|---|---|
| 1,836,699 | 12/1931 | Wood | 354/275 |
| 4,335,948 | 6/1982 | Cocco | 354/275 |
| 4,488,796 | 12/1984 | Edwards | 354/275 |
| 4,875,638 | 10/1989 | Harvey | 242/71.1 |
| 4,887,110 | 12/1989 | Harvey | 354/275 |
| 4,894,673 | 1/1990 | Beach | 354/275 |
| 5,030,978 | 7/1991 | Stoneham et al. | 354/275 |
| 5,032,861 | 7/1991 | Pagano | 354/275 |
| 5,255,039 | 10/1993 | Miller | 354/275 |
| 5,264,886 | 11/1993 | Byrd | 354/275 |
| 5,278,600 | 1/1994 | Takahashi et al. | 354/275 |
| 5,285,227 | 2/1994 | Lawther et al. | 354/275 |

*Primary Examiner*—Michael L. Gellner
*Assistant Examiner*—John Chizmar
*Attorney, Agent, or Firm*—Roger A. Fields

[57] ABSTRACT

A film cartridge comprises a housing having a film exit slit, and a film roll support rotatable inside the housing to unwind a filmstrip beginning with a film leader having several frame lengths from the film roll support to allow the film leader to be moved outwardly through the slit to accomplish film loading in a camera. A visible film-loaded indicator is located to be seen through a window in a camera. A cover strip covers the indicator to prevent the indicator from being seen. A tether has a forward portion located at the slit for releasably engaging the film leader and a rearward portion releasably engaging the cover strip. An engageable portion is located on the film leader for engagement with the forward portion of the tether as the film leader is moved outwardly through the slit, to make the tether move with the film leader to draw the cover strip off the indicator when the film leader is moved out of the housing sufficiently to accomplish film loading in a camera. A return spring urges the tether to disengage its forward portion from the engageable portion of the film leader and its rearward portion from the cover strip after the cover strip is drawn off the indicator.

6 Claims, 6 Drawing Sheets

FILM CARTRIDGE WITH VISUAL INDICATOR FOR VERIFYING FILM LOADING IN CAMERA

CROSS-REFERENCE TO RELATED APPLICATIONS

Reference is made to commonly assigned copending applications Ser. No. 08/584853, entitled FILM CARTRIDGE WITH VISUAL INDICATOR FOR VERIFYING FILM LOADING IN CAMERA and filed Jan. 11, 1996 in the names of Madhay Mehra and Joseph A. Manico, Ser. No. 08/584480, entitled FILM CARTRIDGE WITH VISUAL INDICATOR FOR VERIFYING FILM LOADING IN CAMERA and filed Jan. 11, 1996 in the names of Joseph A. Manico and Dwight J. Petruchik, and Ser. No. 08/449032, entitled FILM SPOOL WITH BUILT-IN AUDIBLE INDICATOR FOR VERIFYING FILM LOADING IN CAMERA and filed May 24, 1995 in the name of Joseph A. Manico.

FIELD OF THE INVENTION

The invention relates generally to the field of photography, and in particular to a film cartridge with a visual indicator for verifying film loading in a camera for example

BACKGROUND OF THE INVENTION

To load most 35 mm cameras, a film cartridge is inserted in a loading chamber of the camera and the forward end portion of a film leader protruding from a light-trapping slit in the cartridge is placed over a take-up spool in the camera. In some cameras, the forward end portion of the film leader is manually attached to the take-up spool before a rear door of the camera is closed. Then, a film loading or winding operation is performed, for example, by manually pivoting a winding lever for the take-up spool and manually depressing a shutter release button several times. This is done until the entire leader is unwound from a supply spool inside the cartridge and is wound onto the take-up spool, and the first-available film frame is positioned for exposure. In other cameras, the forward end portion of the film leader is automatically secured to the take-up spool at the beginning of the film loading operation. As the take-up spool is rotated via a motor drive, for example, one or more circumferential teeth of the spool engage the forward end portion of the film leader at its perforations to wind the leader onto the spool and position the first-available film frame for exposure. A spring-like deflector or other suitable means may be provided on the rear door of the camera for pressing the film leader against the take-up spool to facilitate engagement of the forward end portion of the leader by the circumferential teeth of the spool.

A problem that exists in some 35 mm cameras is that even though the photographer believes the forward end portion of the film leader is secured to the take-up spool, the forward end portion may fail to be engaged with the spool or may become disengaged from the spool during the film loading operation. As a result, the film leader will not be wound onto the take-up spool and the first-available film frame cannot be positioned for exposure. However, since the rear door of the camera is closed, the photographer may not be aware of the malfunction.

SUMMARY OF THE INVENTION

According to the invention, a film cartridge comprising a housing having a film exit slit, and a film roll support rotatable inside the housing to unwind a filmstrip from the film roll support to permit the filmstrip to be moved outwardly through the slit, is characterized by:

an indicator for providing a visible indication that the filmstrip has been moved outwardly through the slit;

a cover strip covering the indicator to prevent the indicator from being seen;

a tether having forward means located at the slit for releasably engaging the filmstrip and rearward means releaseably engaging the cover strip;

engageable means located on the filmstrip for engagement with the forward means as the filmstrip is moved outwardly through the slit, to make the tether move with the filmstrip to draw the cover strip off the indicator; and return spring means for urging the tether to disengage the forward means from the engageable means and the rearward means from the cover strip after the cover strip is drawn off the indicator.

More particularly, a film cartridge comprising a housing having a film exit slit, and a film roll support rotatable inside the housing to unwind a filmstrip beginning with a film leader having several frame lengths from the film roll support to allow the film leader to be moved outwardly through the slit to accomplish film loading in a camera, is characterized by:

a visible film-loaded indicator located to be seen through a window in a camera;

a cover strip covering the indicator to prevent the indicator from being seen;

a tether having forward means located at the slit for releasably engaging the film leader and rearward means releaseably engaging the cover strip;

engageable means located on the film leader for engagement with the forward means as the film leader is moved outwardly through the slit, to make the tether move with the film leader to draw the cover strip off the indicator when the film leader is moved out of the housing sufficiently to accomplish film loading in a camera; and return spring means for urging the tether to disengage the forward means from the engageable means and the rearward means from the cover strip after the cover strip is drawn off the indicator.

DETAILED DESCRIPTION OF THE INVENTION

Figure 1:
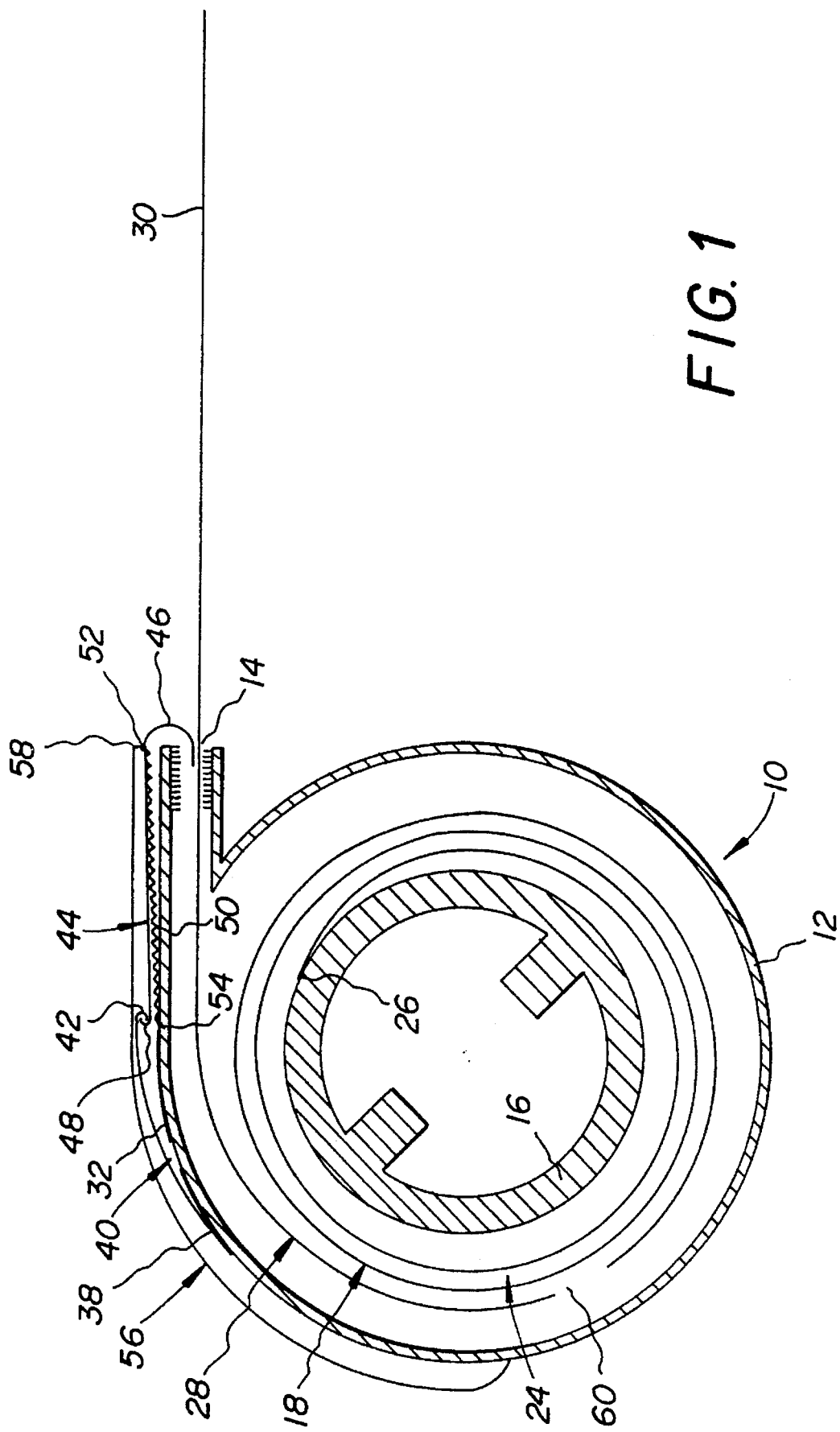
FIG. 1 is a partial section view of a film cartridge with a visual indicator for verifying film loading in a camera according to a preferred embodiment of the invention, showing the cartridge with a film leader partially protruding from the cartridge before film loading.

The invention is disclosed as being embodied preferably in a film cartridge. Because the features of a film cartridge are generally known, the description which follows is directed in particular only to those elements forming part of or cooperating directly with the disclosed embodiment. It is to be understood, however, that other elements may take various forms known to a person of ordinary skill in the art.

Referring now to the drawings, FIGS. 1–9 show a film cartridge 10 comprising a housing 12 with a plush-lined light-trapping film exit slit 14 and a flanged film spool 16 rotatably supported inside the housing. A 35 mm filmstrip 18 having two identical series of edge perforations 20 inwardly adjacent respective longitudinal film edges 22 is loosely coiled in a film roll 24 about the film spool 16 between a pair of radial flanges, not shown, on the film spool. An inner end portion 26 of the filmstrip 18 is attached to the film spool 16. The first several frame lengths, i.e. 3–4 frame lengths, of the filmstrip 18 constitute a film leader 28. The film leader 28 forms an outermost convolution of the film roll 26 and has a partly reduced-width forward or leading end portion 30 that initially protrudes from the film exit slit 14. See FIGS. 1, 4 and 7.

A "FILM LOADED" 32 indicator is imprinted on the exterior of the housing 12 at a location that permits the indicator to be seen through a rear window 34 of a camera 36 when the cartridge 10 is in the camera. See FIGS. 3, 6, 9 and 11. A "FILM USED" indicator 38 is imprinted on the exterior of the housing 12 at a location that prevents the indicator from being seen through the rear window 34.

A substantially inflexible, opaque cover strip 40 covers the "FILM LOADED" indicator 32 and the "FILM USED" indicator 38 as shown in FIG. 1 to prevent the "FILM LOADED" indicator and the "FILM USED" indicator from being seen. The cover strip 40 has a forward or leading end 42 that is bent into a partial curve to be engageable.

A flexible tether 44 is narrower than the filmstrip 18 to avoid interfering with any access in the camera 36, for known purposes, to the two series of edge perforations 20 of the filmstrip 18. See FIGS. 5 and 8. The tether 44 has a compliant forward or leading end hook 46 that is curved slightly into the film exit slit 14 as shown in FIG. 1, to rest on the protruding forward end portion 30 of the film leader 28. A compliant rearward or trailing end 48 of the tether 44 is bent into a partial curve to releaseably engage the complementary curved forward or leading end 42 of the cover strip 40 as shown in FIG. 1.

A return tension spring 50 has a forward end 52 connected to the tether 44, behind the forward end hook 46, and a rearward end 54 connected to the exterior of the housing 12 ahead of the "FILM LOADED" indicator 32 as shown in FIG. 1.

Figure 2:
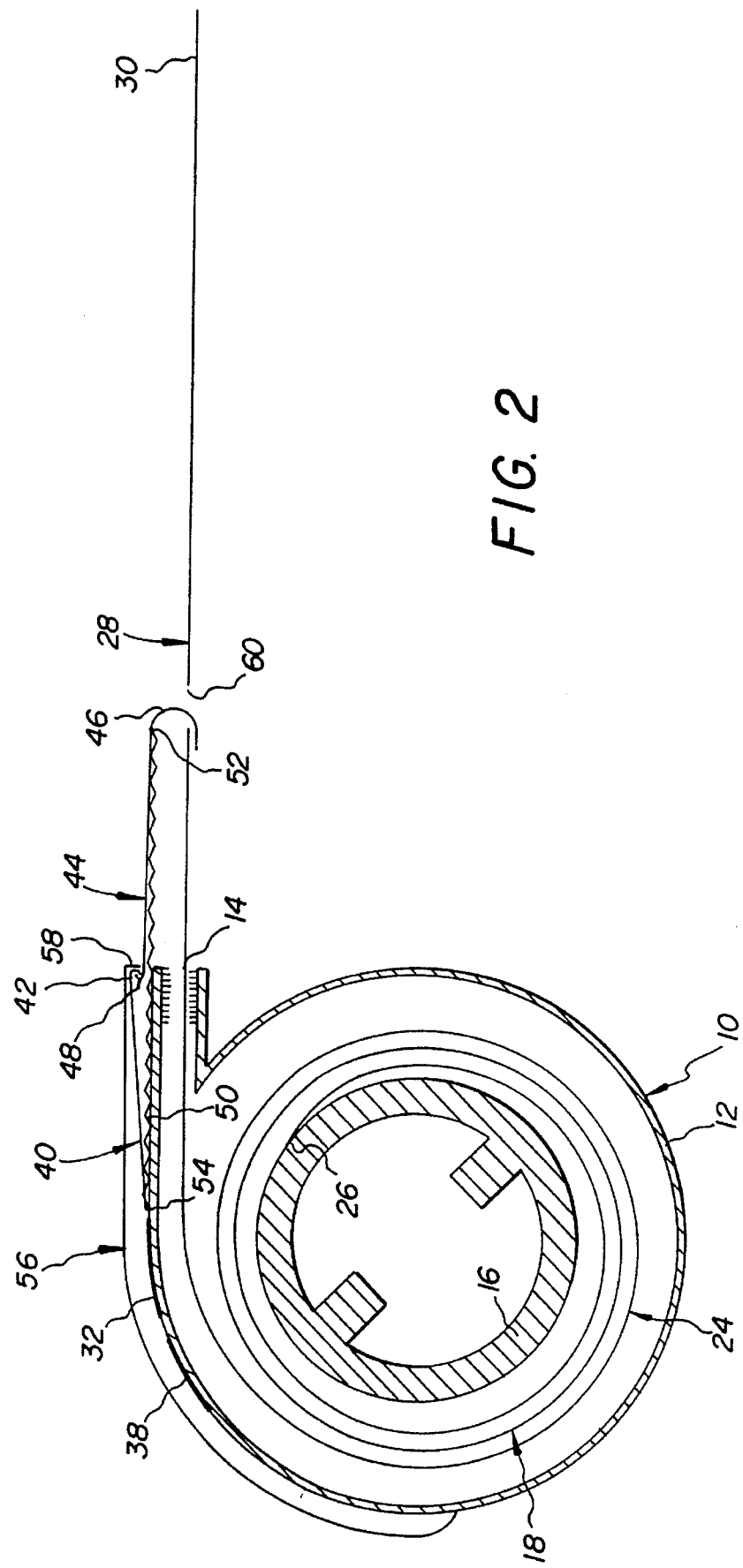
FIG. 2 is a partial section view similar to FIG. 1, showing the cartridge with the film leader partially withdrawn from the cartridge for film loading.
Figure 3:
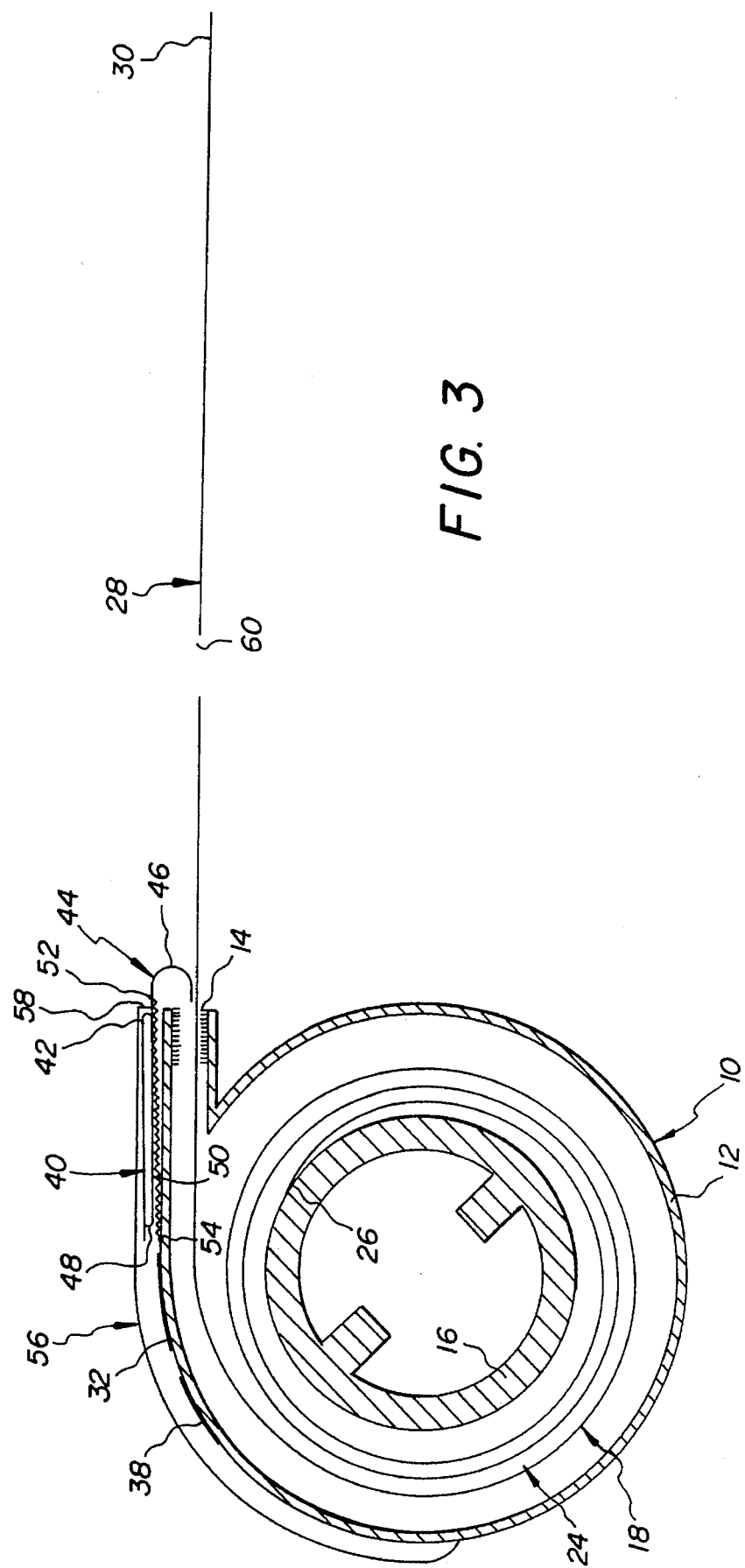
FIG. 3 is a partial section view similar to FIG. 1, showing the cartridge with the film leader substantially completely withdrawn from the cartridge for film loading.
Figure 4:
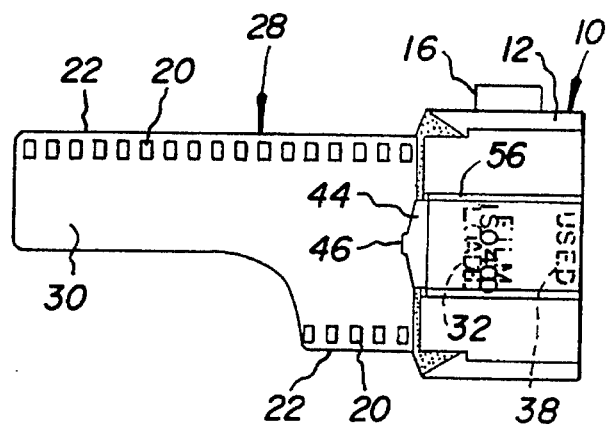
FIG. 4 is a plan view of the cartridge as seen in FIG. 1.
Figure 5:
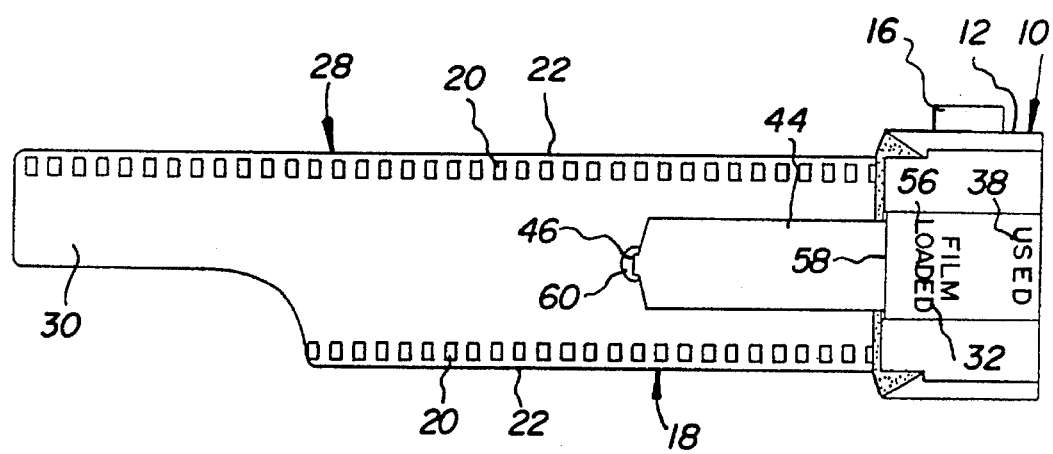
FIG. 5 is a is a plan view of the cartridge as seen in FIG. 2.
Figure 6:
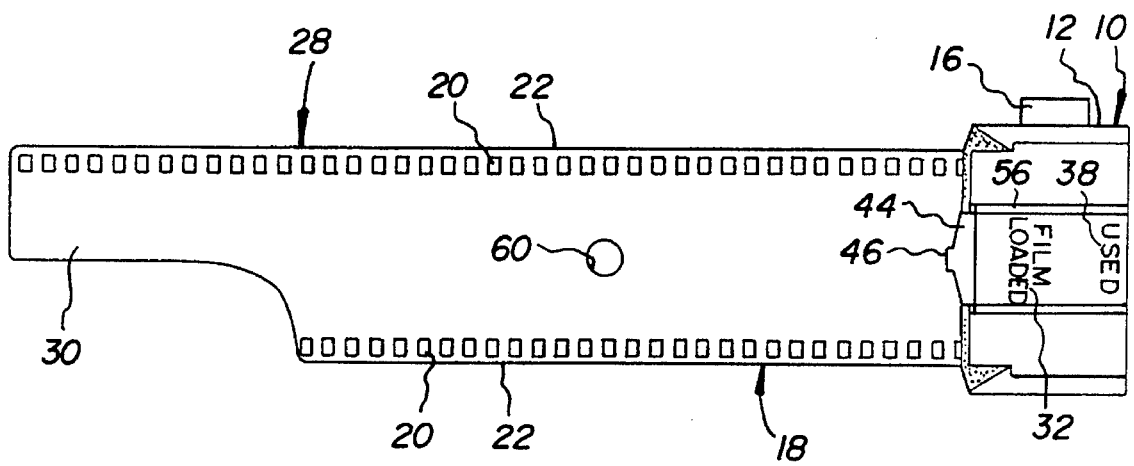
FIG. 6 is a is a plan view of the cartridge as seen in FIG. 3.
Figure 7:
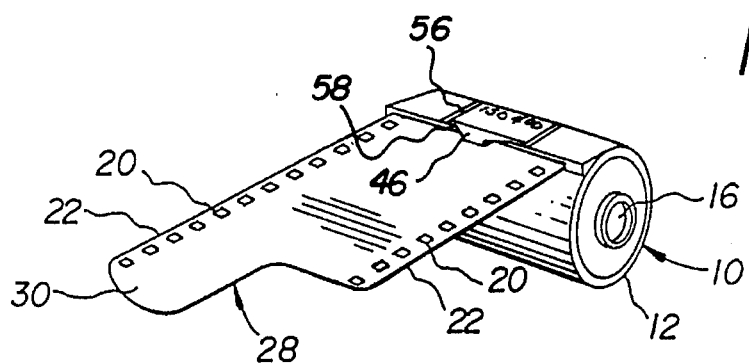
FIG. 7 is a perspective view of the cartridge as seen in FIGS. 1 and 4.

A transparent pocket 56 is secured to the exterior of the housing 12 over the cover strip 40 and the tether 44 as shown in FIG. 1. The pocket 56 is open adjacent the film exit slit 14 to permit the tether to be drawn out of the pocket as shown in FIGS. 2, 5 and 7, contrary to a return urging of the spring 50. A stop end-lip 58 of the pocket 56 is located to block the curved rearward end 48 of the tether 44 to prevent the tether from being drawn completely out of the pocket. See FIG. 2.

Operation

When the cartridge 10 is inserted in the camera 36, the "FILM LOADED" indicator 32 cannot be seen in the rear window 34 because the cover strip 40 is covering the indicator. See FIGS. 1, 4, 7 and 10.

Figure 8:
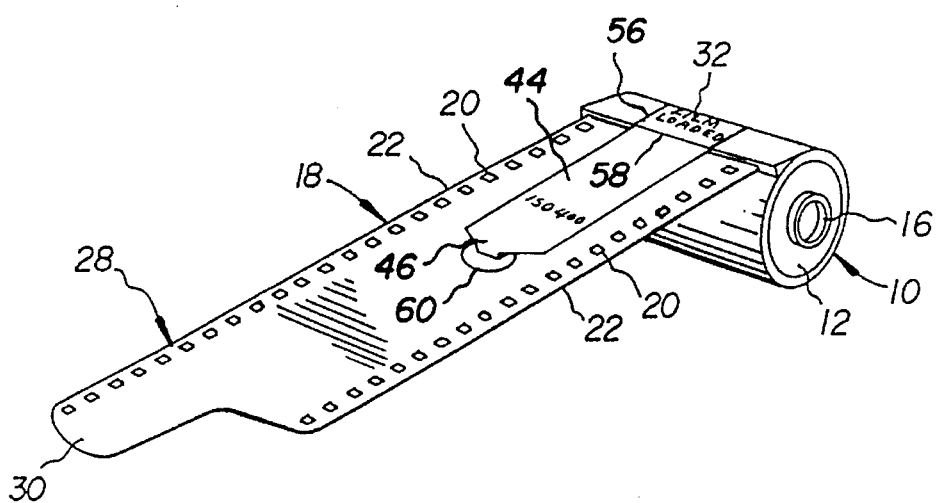
FIG. 8 is a perspective view of the cartridge as seen in FIGS. 2 and 5.
Figure 9:
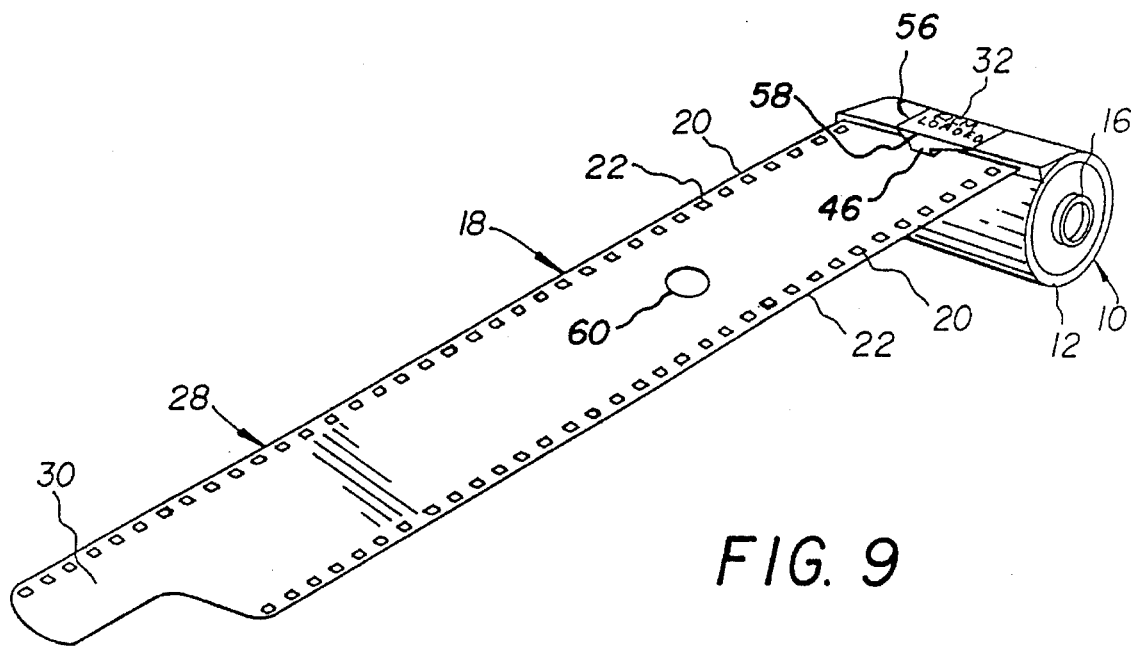
FIG. 9 is a perspective view of the cartridge as seen in FIGS. 3 and 6.
Figure 10:
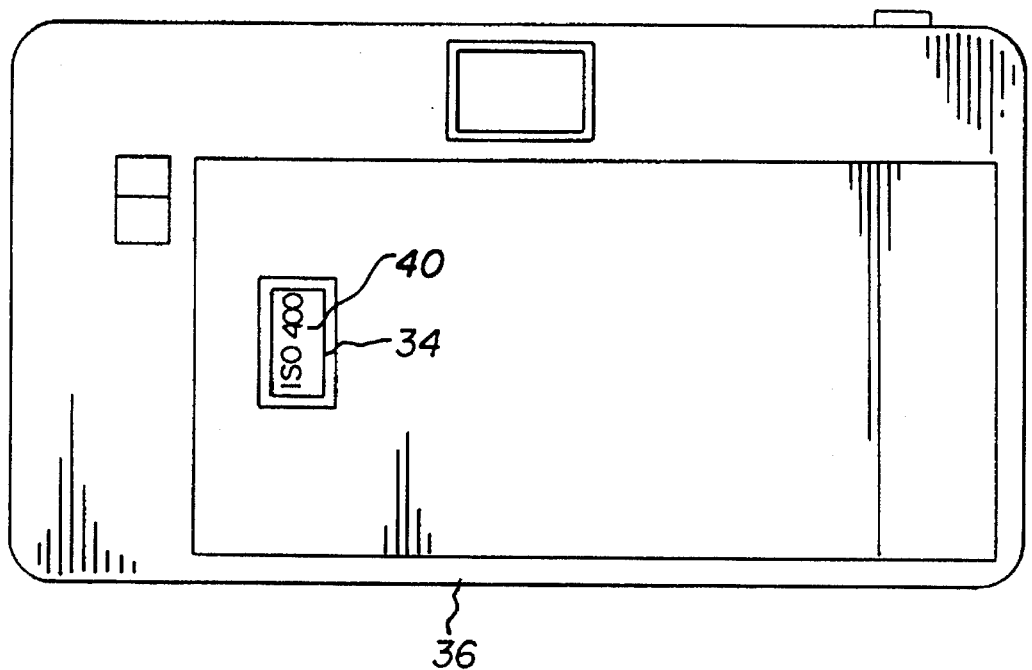
FIG. 10 is a rear elevation view of camera containing the cartridge as seen in FIGS. 1, 4 and 7.
Figure 11:
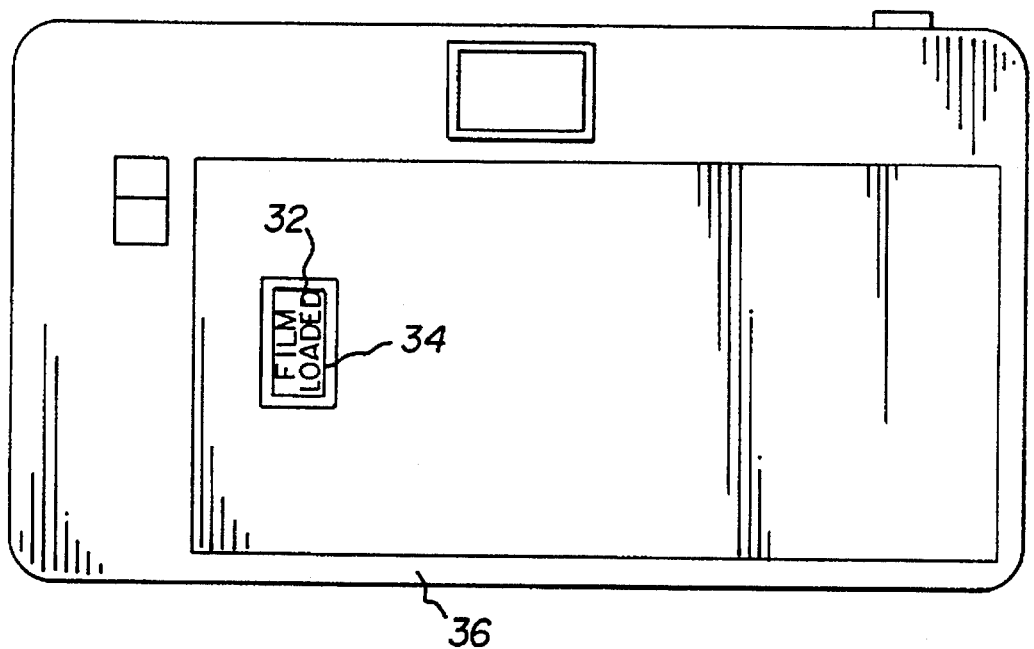
FIG. 11 is a rear elevation view of camera containing the cartridge as seen in FIGS. 3, 6, and 9.

The protruding forward end portion 30 of the film leader 28 is attached to a take-up spool, not shown, in the camera 36 and the spool is windingly rotated to wind the protruding forward end portion onto the take-up spool and to unwind the remaining portion of the film leader 28 that forms the outermost convolution of the film roll 26 off the film roll and onto the take-up spool. As the film leader 28 is moved out of the housing 12 and towards the take-up spool, a leader hole 60 substantially rearward in the film leader is advanced off the film roll 26 and into the film exit slit 14. When the leader hole 60 begins to emerge from the film exit slit 14, the end hook 46 of the tether 44 drops into the leader hole to engage the tether to the film leader 28. Then, the tether 44 is moved in engagement with the film leader 28. Consequently, the tether 44, except for its curved rearward end 48 which is blocked by the stop end-lip 58 of the pocket 56, is drawn out of the pocket contrary to the return urging of the spring 50, and the cover strip 40 is pulled within the pocket 56 to successively uncover the "FILM USED" indicator 38 and the "FILM LOADED" indicator 32. See FIGS. 1, 2, 4, 5, 7 and 8. Thus, as shown in FIGS. 2, 5 and 8, the "FILM LOADED" indicator 32 is not uncovered until the film leader 28 is substantially removed from the housing 12. This serves to verify that enough of the filmstrip 18, i.e. 3–4 frame lengths, has been unwound from the film spool 16 to wind the film leader 28 onto the take-up spool in order to accomplish film loading in the camera 36.

Further winding of the film leader 28 onto the take-up spool causes the leader hole 60 to become separated from the end hook 46 of the tether 44 (since the curved rearward end 48 of the tether is blocked by the stop end-lip 58 of the pocket 56). Consequently, the spring 50 pulls the tether 44 back into the pocket 56 beneath the cover strip 44, disengaging the curved rearward end 54 of the tether from the curved forward end 42 of the cover strip. See FIGS. 3, 6 and 9. The cover strip 44 is left in place removed from the uncovered "FILM USED" indicator 38 and the uncovered "FILM LOADED indicator 32.

The invention has been described with reference to a preferred embodiment. However, it will be appreciated that variations and modifications can be effected by a person of ordinary skill in the art without departing from the scope of the invention. For example, a second leader hole identical to the leader hole 60 can be provided in the film leader 28 closely behind the first hole to allow the end hook 46 of the tether 44 to drop into the second hole in the event the end hook fails to drop into the first hole. This further ensures engagement of the film leader 28 with the leading end portion 42 of the cover strip 40. Alternatively, a pair of parallel identical end hooks can be provided on the tether 44 to simultaneously drop into respective leader holes. In this instance, the leader holes could be located in the respective series of edge perforations 20 of the filmstrip 18.

PARTS LIST 10. film cartridge
12. housing 14. slit
16. film spool
18. filmstrip
20. film perforations
22. longitudinal film edges
24. film roll
26. film inner end portion
28. film leader
30. protruding forward end portion
32. "FILM LOADED" indicator
34. rear window
36. camera
38. "FILM USED" indicator
40. cover strip
42. curved forward end
44. tether
46. forward end hook
48. curved rearward end
50. return spring
52. forward spring end
54. rearward spring end
56. pocket
58. stop end-lip
60. leader hole

We claim:

1. A film cartridge comprising a housing having a film exit slit, and a film roll support rotatable inside said housing to unwind a filmstrip from said film roll support to permit said filmstrip to be moved outwardly through said slit, is characterized by:

an indicator for providing a visible indication that said filmstrip has been moved outwardly through said slit;

a cover strip covering said indicator to prevent the indicator from being seen;

a tether having forward means located at said slit for releasably engaging said filmstrip and rearward means releaseably engaging said cover strip;

engageable means located on said filmstrip for engagement with said forward means as the filmstrip is moved outwardly through said slit, to make said tether move with the filmstrip to draw said cover strip off said indicator; and return spring means for urging said tether to disengage said forward means from said engageable means and said rearward means from said cover strip after the cover strip is drawn off said indicator.

2. A film cartridge as recited in claim 1, wherein said forward means of said tether is bent slightly into said slit in the form of a hook.

3. A film cartridge as recited in claim 1, wherein said forward means and said rearward means of said tether are compliant to allow the forward means to be disengaged from said engageable means of said filmstrip and to allow the rearward means to be disengaged from said cover strip.

4. A film cartridge as recited in claim 1, wherein said tether is relatively flexible and said cover strip is relatively inflexible.

5. A film cartridge as recited in claim 1, wherein said indicator is located on the exterior of said housing, a transparent pocket is secured to the exterior of said housing to contain said cover strip and said tether and is open adjacent said slit to permit the tether to be drawn out of said pocket as said filmstrip is moved outwardly through the slit with said engageable means engaging said forward means of the tether.

6. A film cartridge comprising a housing having a film exit slit, and a film roll support rotatable inside said housing to unwind a filmstrip beginning with a film leader having several frame lengths from said film roll support to allow said film leader to be moved outwardly through said slit to accomplish film loading in a camera, is characterized by:

a visible film-loaded indicator located to be seen through a window in a camera;

a cover strip covering said indicator to prevent the indicator from being seen;

a tether having forward means located at said slit for releasably engaging said film leader and rearward means releaseably engaging said cover strip;

engageable means located on said film leader for engagement with said forward means as the film leader is moved outwardly through said slit, to make said tether move with the film leader to draw said cover strip off said indicator when the film leader is moved out of said housing sufficiently to accomplish film loading in a camera; and return spring means for urging said tether to disengage said forward means from said engageable means and said rearward means from said cover strip after the cover strip is drawn off said indicator.

\* \* \* \* \*